R. A. GULDEN.
LOCKING DEVICE FOR MOTOR VEHICLES.
APPLICATION FILED JAN. 31, 1916.
1,218,856.
Patented Mar. 13, 1917.
3 SHEETS—SHEET 1.
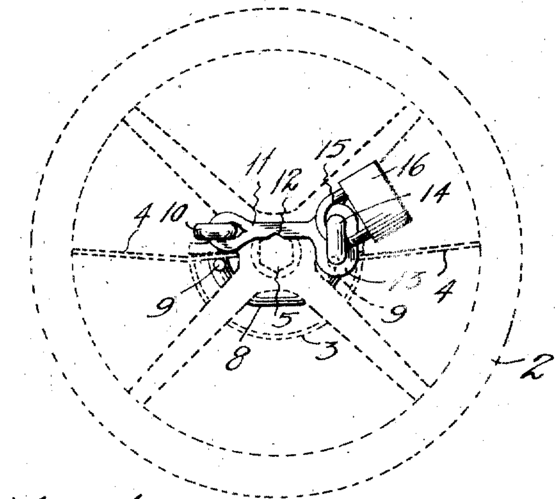
Fig. 1.
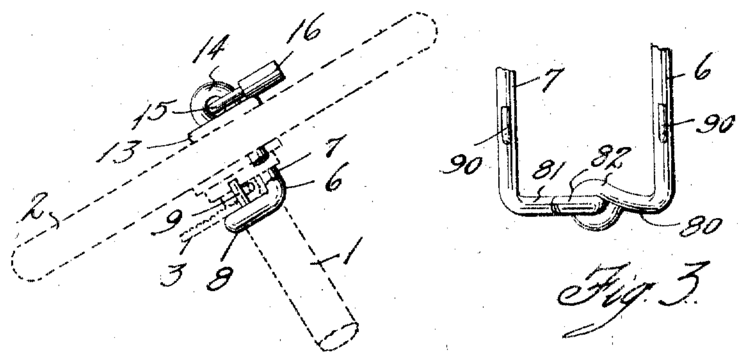
Fig. 3.
Fig. 2.
INVENTOR
R. A. GULDEN.
BY
[signature]
ATTORNEY

R. A. GULDEN.

LOCKING DEVICE FOR MOTOR VEHICLES.

APPLICATION FILED JAN. 31, 1916.

1,218,856.

Patented Mar. 13, 1917.

3 SHEETS—SHEET 2.

INVENTOR

R. A. GULDEN.

BY Jack A. Schley

ATTORNEY

R. A. GULDEN.
LOCKING DEVICE FOR MOTOR VEHICLES.
APPLICATION FILED JAN. 31, 1916.

1,218,856.

Patented Mar. 13, 1917.
3 SHEETS—SHEET 3.

INVENTOR
R. A. GULDEN.
BY
Jack A. Schley
ATTORNEY

UNITED STATES PATENT OFFICE.

RICHARD A. GULDEN, OF WEST DALLAS, TEXAS.

LOCKING DEVICE FOR MOTOR-VEHICLES.

1,218,856. Specification of Letters Patent. Patented Mar. 13, 1917.

Application filed January 31, 1916. Serial No. 75,334.

*To all whom it may concern:*

Be it known that I, RICHARD A. GULDEN, citizen of the United States, residing at West Dallas, in the county of Dallas and State of Texas, have invented certain new and useful Improvements in Locking Devices for Motor-Vehicles, of which the following is a specification.

This invention relates to new and useful improvements in locking devices for motor vehicles.

The object of the invention is to lock the steering wheel of a motor vehicle so that said wheel cannot be rotated sufficiently to steer or guide the vehicle and by locking the steering wheel in such a position that the front wheels of the vehicle are held at an angle to the longitudinal center of the vehicle, the latter cannot be propelled or towed either forward or rearward.

A further object of the invention is to lock the controlling levers for the gasolene and throttle against operation so that the engine cannot be operated.

In the present carrying out of the invention different constructions are required for motor vehicles of various manufacture, but each form includes in common a pair of upright locking members tied to each other at one end; while at the opposite end one or more link members are hinged to one of the upright members and engaged with the other upright member, at which latter point of intersection a lock is applied.

Figure 4:
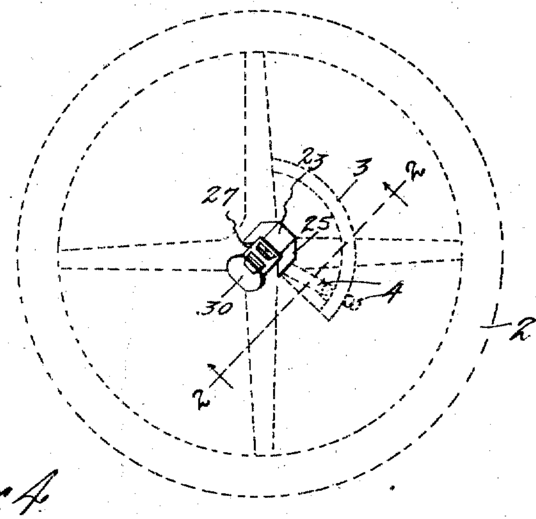
Figure 5:
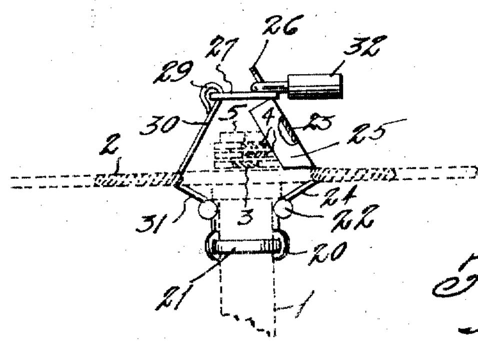
Figure 6:
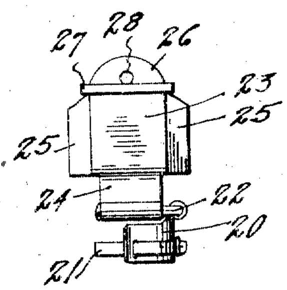
Figure 7:
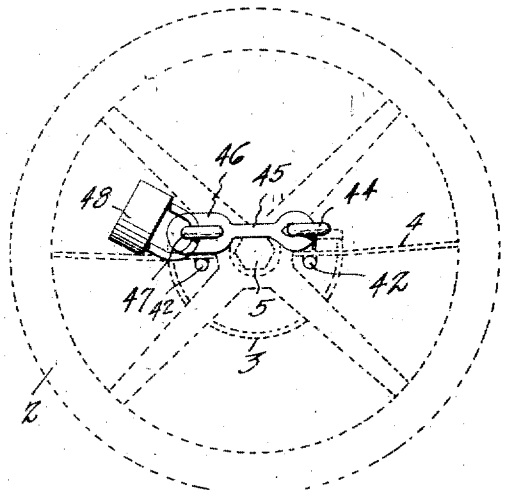
Figure 8:
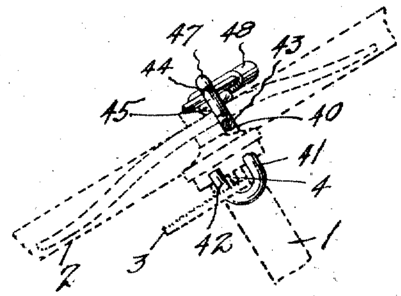
Figure 9:
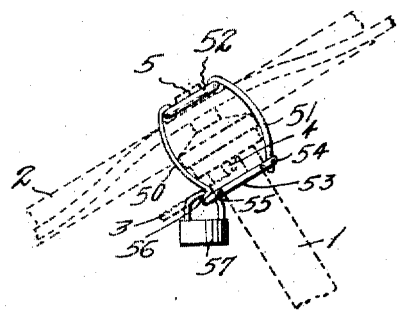
Figure 10:
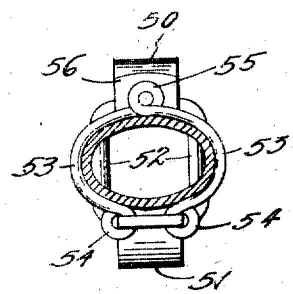

With the above and other objects in view the invention involves certain novel features of construction and operation, examples of which are described in the following specification and illustrated in the accompanying drawings wherein:

Figure 1 is a plan view of the locking device applied to a steering wheel, the latter being shown in dotted lines, Fig. 2 is a side elevation of the same, Fig. 3 is a detail of a slightly modified form, Fig. 4 is a plan view similar to Fig. 1, but showing another form of locking device, Fig. 5 is a sectional view on the line 2—2 of Fig. 4, Fig. 6 is a side elevation of the device shown in the two preceding figures, Fig. 7 is a plan view illustrating still another form, Fig. 8 is a side elevation of the same, one of the members being broken away, Fig. 9 is a side elevation of an inverted form of locking device, and Fig. 10 is an under side view of the same, the steering post being shown in cross-section.

In the drawings and throughout the several figures the numeral 1 designates a steering post, 2 a steering wheel, 3 a lever segment, 4 the controlling levers of said segment, and 5 a nut holding the wheel 2 in place. All of these parts are of common construction and form no part of the invention.

In Figs. 1 and 2 a locking device comprising a pair of upright or elongated members 6 and 7 respectively, are shown. In these figures as well as others, the parts enumerated in the foregoing paragraph are shown in dotted lines while the invention is illustrated in full lines. The members 6 and 7 have their lower ends connected by an arcuate member or keeper 8 directed laterally and adapted to embrace the post 1 as shown.

In applying the locking device the steering wheel 2 is rotated sufficiently to turn the front wheels of the vehicle (not shown) to one side and the controlling levers 4 are pushed up to the highest point where they stand substantially transverse of the wheel. By turning the front wheels as stated and then locking the steering wheel and levers the vehicle cannot be moved either forward or rearward but if started would move only in a circle, also the levers being locked the engine could not be started.

With the steering wheel in the position shown in Fig. 1 the upright members 6 and 7 are passed between the spiders of said wheel and in front of the segment 3 so as to project above the central web of the wheel on each side of the nut 5. Upstanding lugs or pins 9 near each end of the keeper and adjacent the said members project into the paths of the levers 4 so that the same cannot be advanced. The member 7 has an eye 10 at its upper end in which the end of a link 11 is hinged. This link has an angular notch 12 receiving one corner of the nut 5 when the link is placed across the wheel. At its free end the link is provided with an elongated transverse eye 13 which receives an eye 14 on the upper end of the member 6, which latter eye projects above the former.

As shown the bail 15 of a lock 16 is passed through the eye 14 above the eye 13 so that the link can not be lifted or the members 6 and 7 displaced in any direction. It will be noted that the keeper 8 fits snugly against the under side of the collar of the segment 3 and the members 6 and 7 bear against said segment so that the device cannot be rotated. It is impossible to turn the wheel 2 as the spiders of the same will strike the members 6 and 7.

In Fig. 3 a slightly modified form is shown. Only that portion which is different from the parts shown in Figs. 1 and 2 is illustrated. The keeper is formed in two parts 80 and 81 respectively, each terminating in an eye 82. The eyes 82 being inserted one in the other provide a hinge joint which facilitates placing the members 6 and 7 in position. Instead of the pins 9 hooks 90 are employed for the same purpose. These hooks project from the members 6 and 7 and extend upward engaging the levers 4 the same as the pins.

In Figs. 4, 5 and 6 another form of locking device is shown, being designed for vehicles having the segment 3 at one side and the levers 4 both on the same side of the wheel. This device comprises a yoke 22 hinged on the upper edge of collar member 20 corresponding to the keeper 8 and held on the post 1 by a strap 21. To one of the arms of the yoke an upright locking member 23 is hinged by means of a shank 24 bent at angle to the body of the member as shown in Fig. 5. The member 23 is bent so as to straddle the web of the wheel 2 and overhang the levers 4 and nut 5, said levers having been swung to the lower end of the segment. The member 23 is provided with inwardly bent wings 25 which overhang the levers 4 and prevent manipulation of the same.

The member 23 has a tongue 26 at its upper end which is inserted in a slot in a link 27 and projects above the latter so that a lock 32 may be engaged in its eye 28. The link is hinged to the upper end of an upright guard member 30 by means of a loop 29. The member 30 has a shank 31 at its lower end hinged to the yoke and is bent like the member 23. The shanks being reduced permit the members to fit snugly in the crotches between the spiders of the wheel and prevents displacement. The member 30 is made broad and acting with the wings 25 of the other member prevents one gaining access to the fastenings of the levers and wheel.

The form shown in Figs. 7 and 8 is applied the same as that shown in Figs. 1 and 2, and comprises upright members 40 and 41 respectively, each having an upturned hook 42 at lower end corresponding to the lugs 9 and engaging the levers 4 as shown. The members are connected by a keeper 43 which is disposed high enough to bear against the under side of the spider of the wheel 2. The member 41 has an eye 44 at its upper end in which one end of a link 45 is hinged. This link is placed over the spider of the wheel and against the nut 5 as shown. An elongated eye 46 is formed on the free end of the link and receives an eye 47 provided on the upper end of the member 40 so as to be fastened by a lock 48 like the parts in Figs. 1 and 2.

In the construction shown in Figs. 9 and 10 no attempt is made to lock the levers 4 but with the steering wheel turned and the front wheels of the vehicle disposed as described in connection with Figs. 1 and 2, the vehicle when locked could not be driven or towed away. A pair of upright members 50 and 51 respectively are placed on the wheel with the same in the position shown in Fig. 7, the members being disposed one in front of the other so that the member 50 passes through the segment 3. The members are curved to fit the parts as shown and have their upper ends hinged to a link 52 which is large enough to embrace the nut 5. In Fig. 10 a cross section of the post 1 is shown and it will be seen that said post is elongated transversely. Keeper members 53 are shaped to snugly engage the post and each has an eye 54 at one end and an eye 55 at the other end. By means of the eyes 54 the members are hinged to opposite sides of the lower end of the member 51. The eyes 55 of said members are registered with a lug 56 on the lower end of the member 50 so that a lock 57 may be employed to fasten the parts together. It will be apparent that owing to the shape of the post 1 the keeper members 53 cannot be turned thereon and thus the wheel 2 is held against rotation.

In carrying out this invention it is evident that the various parts should be made strong and durable and are preferably made of material which can be case-hardened. The invention is presented as including all such modifications and changes as properly come within the scope of the appended claims.

What I claim is:

1. The combination with the central web of the spider of the steering wheel of a motor vehicle, of a locking device including a pair of upright members straddling the said web and occupying positions on opposite sides of the steering post of the wheel, a connection between the members holding them spaced apart, and means for locking the members in position on the web.

2. The combination with the central web of the spider of a steering wheel and its post, of a pair of upright locking members straddling said web in spaced order on each side of said post, means for connecting the members and holding them apart, a connecting element extending from the free end of one member to which it is hinged to the free end of the other member, and a lock engaging the said free end of the last named member and fastening the free end of the connecting element thereon.

3. In a locking device for the steering wheel of a motor vehicle, a pair of elongated elements connected together and spaced apart to straddle the post and central web of a steering wheel, projections carried by the elements having their free ends positioned to project into the path of the controlling levers of a steering gear, and a fastening connection pivoted to one of the elements and engaging the other element.

In testimony whereof I affix my signature.

RICHARD A. GULDEN.